(12) United States Patent
Alstat

(10) Patent No.: US 6,935,049 B2
(45) Date of Patent: Aug. 30, 2005

(54) METHOD AND APPARATUS FOR RECLAIMING EFFLUENT FROM A FREEZE-DRYING PROCESS, AND USES FOR EFFLUENT

(76) Inventor: Edward K. Alstat, 36350 SE. Industrial Way, Sandy, OR (US) 97055

( * ) Notice: Subject to any disclaimer, the term of this patent is extended or adjusted under 35 U.S.C. 154(b) by 0 days.

(21) Appl. No.: 10/746,475

(22) Filed: Dec. 24, 2003

(65) Prior Publication Data

US 2005/0144804 A1    Jul. 7, 2005

(51) Int. Cl.⁷ .............................................. F26B 5/14
(52) U.S. Cl. ........................................ 34/288; 34/92
(58) Field of Search .................... 34/288, 293, 305, 34/402, 406, 92; 62/74; 159/4.09

(56) References Cited

U.S. PATENT DOCUMENTS 3,132,930 A  *  5/1964  Abbott et al. ................... 34/92
3,531,871 A  * 10/1970  Yukio ............................. 34/257
3,620,776 A  * 11/1971  Mishkin et al. ................ 34/288
3,936,952 A  *  2/1976  Schimpfle ........................ 34/92
4,194,924 A  *  3/1980  Safranko et al. .............. 134/12
4,749,394 A  *  6/1988  Ehrsam ......................... 62/532
5,230,162 A  *  7/1993  Oyler, Jr. ...................... 34/292
6,220,048 B1 * 4/2001  Finan et al. ................... 62/434

* cited by examiner

Primary Examiner—Stephen Gravini
(74) Attorney, Agent, or Firm—Donald R. Boys; Central Coast Patent Agency, Inc.

(57) ABSTRACT

A system for reclaiming effluent from a freeze drying process has at least one condenser apparatus used during a freeze-drying cycle to collect effluent from material being freeze-dried, and a recovery reservoir positioned for collecting material from the condenser apparatus. The system is characterized in that ice crystals formed from the effluent are removed from the condenser after the freeze drying cycle into recovery reservoir to be re-used. Product systems include both freeze-dried material and the effluent collected during freeze drying.

21 Claims, 6 Drawing Sheets

Freeze-dry Water Recovery System

*Fig. 1 (prior Art)*

Freeze-dry Water Recovery System

Freeze-dry Water Recovery System

METHOD AND APPARATUS FOR RECLAIMING EFFLUENT FROM A FREEZE-DRYING PROCESS, AND USES FOR EFFLUENT

FIELD OF THE INVENTION

The present invention is in the field of biological preservation of bio-products including that of animal-based foods, botanical-based foods, herbs and other botanicals. The invention pertains particularly to methods and apparatus for reclamation and later use of effluents generated during a freeze-drying process for general-purpose use and for use in reconstituting the dried product.

BACKGROUND OF THE INVENTION

In the field of bio-preservation, one of the most successful and well-known processes is the process of freeze-drying. Freeze-drying is the process of freezing a product under a high vacuum to extract most of the moisture from the product and then by heating the same product under vacuum in a vacuum chamber to extract the small amount of moisture that is left in the product.

The process of freeze-drying was originally implemented during World War II as a method for preserving blood plasma and pharmaceuticals. Eventually it became a recognized method for preserving fruits, vegetables, and other commercially grown bio-products. More recently, freeze-dry methods are being used in a variety of technical fields from chemical processing to producing super computer conductors.

The most common freeze-dry operations are those that process fruits, vegetables, herbs, and other consumables that are commercially available. The main purpose for employing the freeze-dry method is not an economic one, but rather that it is arguably the most successful preservation method for extracting water from a product wherein the cellular structure of the product is least damaged, allowing for better reconstitution of the product to most closely resemble it's natural state before drying.

There are small, moderate, and very large commercial freeze-drying systems available and in commercial operation Typically, companies that provide commercial freeze-drying services to other entities maintain the largest commercial freeze-dry systems. Some utilize multiple (20 or more) vacuum chambers each having a diameter equal to or greater than 6 feet. These are the systems that usually can be contracted and work as batch units drying multiple product batches simultaneously on a large commercial scale.

The basic components of a freeze-dry system are a vacuum chamber supporting shelves for product placement, a condenser, a condenser refrigeration unit, a vacuum pump for providing a vacuum in the chamber, and a heat-transfer/cooling system integrated, in most cases with the product shelves for temperature controlled heating and cooling. Freeze-dry systems are typically operated from a control panel that provides program control over, temperature, vacuum pressure, time, and so on. Different types of products require different measures of control to produce the best result in freeze-drying. In some simpler cases the condenser, which is in the chamber for collecting water vapor as ice, is not equipped to be heated to melt the ice after a run, but the ice is mechanically removed, such as by chipping or scraping, or melted by spraying the condenser with water.

Production of wastewater, generally referred to in this specification as effluent, is one aspect of the freeze-dry process, the wastewater resulting from the moisture extracted from the products being dried. The way the process works is that the product is frozen before undergoing vacuum. At higher vacuum levels the water in the frozen state is vaporized (sublimated) without entering a liquid stage by maintaining an unbalanced state between the ice and the temperature/vacuum conditions. The water vapor produced from the solid ice eventually forms on the much colder condenser as ice crystals. The condenser may take several forms like a coil system, a cone-shaped apparatus, an array of plates, and so on. The condenser is cooled using a refrigeration unit to a temperature lower than the chamber temperature under vacuum causing the extracted vapor to collect on the condenser in the form ice crystals.

After freeze-dried product is removed and the temperature rises, the ice crystals typically melt and fall to the floor of the vacuum chamber (internal condenser) or condenser housing (if external) during a defrost operation. Manual methods may be used to scrape or chip the ice, as described also above; or water or other material, for example, may be used to melt the ice. The moisture is typically output from the system as wastewater.

It has occurred to the present inventor that the wastewater produced by freeze-dry operations could, if properly reclaimed, be used for many interesting, advantageous, and unique purposes, rather than being discarded into the sewer system or dumped as a waste product.

Therefore, what is clearly needed are methods and apparatus for recovering the effluent extracted from products that have been freeze dried, and methods for use of recovered product.

SUMMARY OF THE INVENTION

In a preferred embodiment of the present invention a system for reclaiming effluent from a freeze drying process is provided, comprising at least one condenser apparatus used during a freeze-drying cycle to collect effluent from material being freeze-dried, and a recovery reservoir positioned for collecting material from the condenser apparatus. The system is characterized in that ice crystals formed from the effluent are removed from the condenser after the freeze drying cycle into recovery reservoir to be re-used.

In one embodiment of the invention there are two recovery tanks and two condensers arrayed as selectable pairs, the pairs alternately selectable for effluent reclamation. Also in one embodiment there may be a heating mechanism for heating the condenser to facilitate collection of the effluent from the condenser. Also in an embodiment each condenser may comprise a heating mechanism to facilitate collection of the effluent from the condenser.

In some embodiments the at least one condenser refrigeration and heating unit has access to two transfer mediums, one for super cooling the condenser, and another for supplying heat to the condenser. Also in some embodiments the transfer mediums may include Liquid Nitrogen, an Ammonia solution, or Freons for cooling and Propylene, Lexol, Glycol, or Glycerin for heating.

In some cases the condenser refrigeration and heating units may have access to two transfer mediums, one for cooling and one for heating, the mediums including Liquid Nitrogen, an Ammonia solution for cooling and Propylene, Lexol, Glycol, or Glycerin for heating. Also in some cases the at least one recovery tank may have a secondary vessel connected thereto for storing effluent, the vessel insulated against freezing during the freeze drying process.

In some embodiments the heating mechanism may be a steam generator plumbed to the condenser. In some embodiments there may also be a compression filter for separating water from other components for steam generation. Still further, the ice crystals representing effluent drawn from a product being dried may collected on a selected condenser at the end of a freeze-dry run and may be heated by the steam generator via steam injection causing the ice to melt off into the associated recovery tank wherein it may be pumped out of the tank.

In another aspect of the invention a method for reclaiming effluent from a freeze-dry system and converting the effluent into a useable product has steps of (a) providing at least one water recovery tank under at least one condenser unit of the system; (b) condensing vapor drawn from a product being dried in the system onto the condenser in the form of ice; and (c) collecting and melting the ice from the condensed after a freeze drying cycle to be reused.

In some embodiments of this method there are two recovery tanks and two condensers arrayed as selectable pairs, the pairs alternately selectable for water reclamation from a control station. Also in some embodiments collecting is facilitated by a heating mechanism used to heat the condenser. Further there may be two heating mechanisms, one unit for each condenser.

In some embodiments the condenser may have access to two transfer mediums, one for super cooling the condenser, and another for supplying heat to the condenser. Also in some embodiments the transfer mediums may include Liquid Nitrogen, an Ammonia solution, or Freons for cooling and Propylene, Lexol, Glycol, or Glycerin for heating.

In some cases in step (a) of the method the at least one recovery tank may have a secondary vessel connected thereto for storing effluent, the vessel insulated against freezing. In other embodiments in step (c) heating may be performed by a heat source delivery mechanism in the form of a steam generator plumbed to the at least one condenser. In yet other embodiments there may also be a compression filter for separating water from other components for steam generation.

In yet another aspect of the invention a freeze dried product system has a freeze-dried material in one container, the material lacking effluent water removed in the freeze drying process, and the effluent in a second container, the effluent collected from the material in the first container during the freeze-drying process.

DESCRIPTION OF THE PREFERRED EMBODIMENTS

The inventor provides a freeze-dry system capable of wastewater recovery, such that the otherwise wasted water may be used for advantageous purposes, the methods and apparatus thereof described in enabling detail below.

Figure 1:
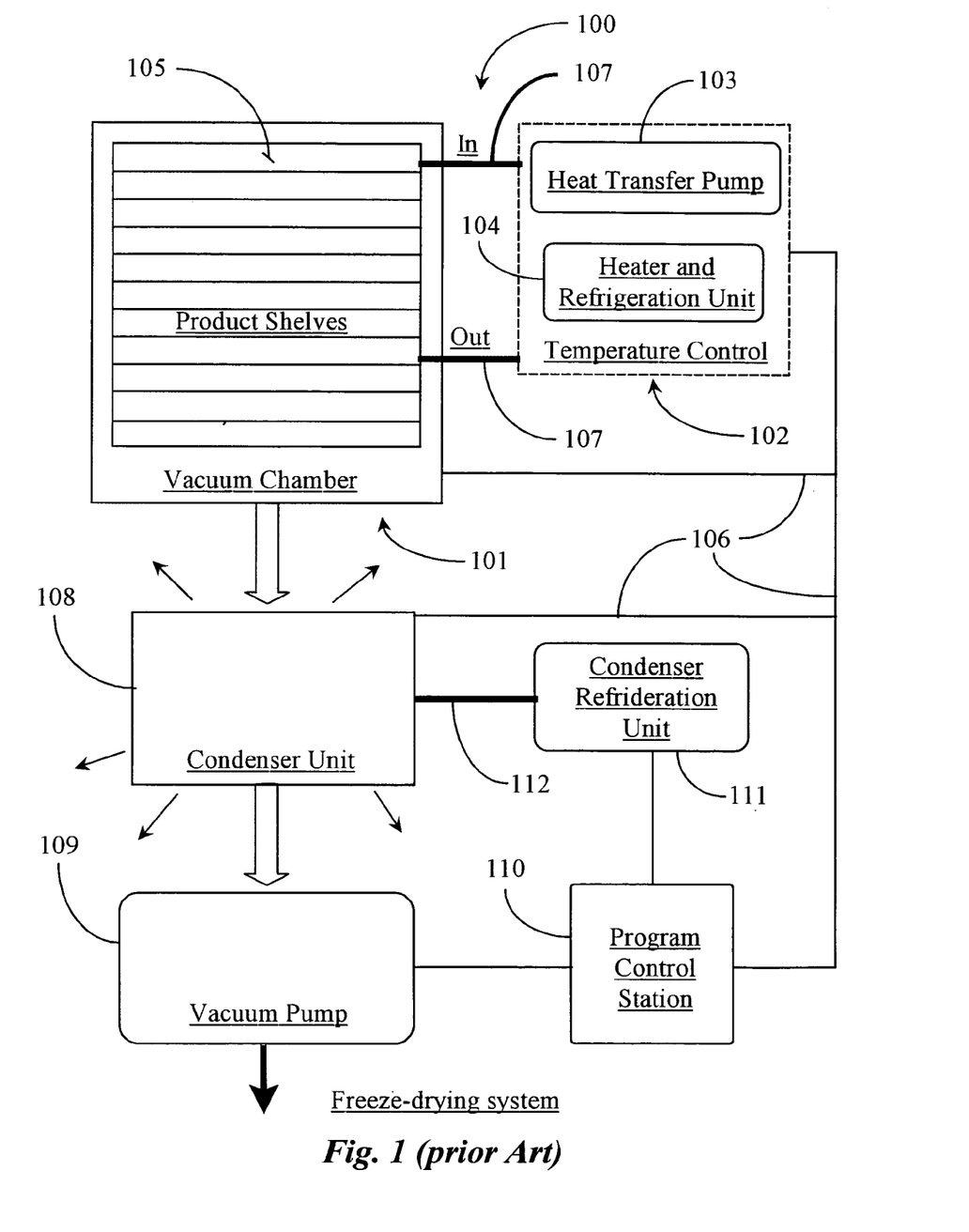
FIG. 1 is a block diagram illustrating a typical architecture of a freeze-dry system according to prior art.

FIG. 1 is a block diagram illustrating a typical architecture of a freeze-dry system 100 according to prior art. As was described briefly in the background section of this specification, a typical freeze-dryer of prior art comprises a vacuum chamber and shelves for holding product, a vacuum pump for chamber evacuation, a condenser for providing freezing of vapor sublimated from product, and a control station for initiation and control of the process.

System 100 has a vacuum chamber 101, serving as a chamber for housing the product to be freeze-dried. Chamber 101 is formed in this example in the general shape of a barrel having a diameter and depth, although the shape and size of the chamber may vary widely in different examples of equipment. Chamber 101 in this example also has a plurality of product shelves 105 supported therein for the purpose of holding product during processing. Shelves 105 in this example are arrayed horizontally in chamber 101.

The temperature within chamber 101 is primarily controlled by a temperature control unit 102. Unit 102 in this example has a heating and refrigeration unit 104 and a heat transfer pump 103. Pump 103 pumps a temperature transfer medium through shelving 105, such as Lexol, Propylene, Glycol, or Glycerin. These mediums can be heated or cooled to exact temperature specification reducing drying time for products over some more primitive systems. By maintaining an unstable condition with respect to temperature change and vacuum, the freeze-dry process is enabled and optimized. Unit 102 is coupled to chamber 101 and shelves 105 by inlet and outlet lines 107, which are adapted to carry the transfer medium. Transfer tubing (not shown) is arrayed along the individual shelves so that heating or cooling affects the product most directly. Also, as described briefly above, in simpler cases heating may not be employed.

System 100 in this example has an external condenser unit 108 provided thereto for the purpose of drawing moisture in the form of sublimated vapor away from the product arrayed on shelves 105 during freeze-drying. Condenser 108 in many cases may be positioned within chamber 101, but there are some advantages in some cases for external placement. Condenser 108 is cooled separately from chamber 101 by a condenser refrigeration unit 111. Refrigeration unit 111 uses, for example, Freons, a solution of Ammonia or Liquid Nitrogen or the like to cool the condenser apparatus, which may be a system of coils, plates, cones, or other apparatus. In this example, condenser 108 is positioned externally from chamber 101, however in some systems the condenser is within the vacuum chamber itself. Unit 111 is connected to unit 108 by a transfer line 112.

System 100 has a vacuum pump 109 provided to evacuate chamber 101, including the volume occupied by the condenser. Pump 109 is positioned in this example on the side of condenser 108 opposite from chamber 101, but could be interfaces elsewhere. System 100 is controlled from a program control station 110. Station 110 has control lines (106) leading to the various components, namely to components 102, 101, 108, 111, and 109. Station 110 provides system control over temperature inside chamber 101 and condenser 108. Vacuum pressure and time of vacuum is controlled from station 110.

The prior-art system of this example lacks a capability for recovering process effluent. Typically product supported on shelves 105 is pre-frozen before the freeze drying process ensues. By introducing a high vacuum and then regulating the temperature within the vacuum chamber moisture is extracted from the product in a first "primary" freeze-dry phase. During a second phase heat is typically introduced into shelves 105 via unit 102 and a remaining small percentage of moisture remaining in the product is extracted under increased vacuum. The second phase functions typically to draw an additional 10–20% of the remaining moisture left in the product after the first stage. For example, for typical botanical products, most of the moisture is drawn out during the primary phase. The second phase draws out an additional 10–20% of the remaining moisture in typical cases. A typical dried product is left with from 2–9% moisture content.

A typical run for a raw botanical material may have an initial freeze-down phase of minus 30 degrees Celsius at normal atmospheric pressure for approximately 2 hours. An additional 4 hours may be included at the same temperature but with an initial vacuum pressure of 0.3 mBar. A primary drying phase may last 18–24 hours at −10 degrees Celsius at a vacuum pressure of 0.2 mBar. The secondary drying phase may last another 12 hours wherein the temperature is raised in the vacuum chamber to +30 degrees Celsius and the vacuum chamber is pumped further down to 0.1 mBar.

Typically, effluent falls from the condenser as ice or water and runs out via a gutter system and onto the ground, or into a sewer inlet, for example, as wastewater. If the condenser is housed within the product chamber then the wastewater typically falls to the floor of the product chamber and is guttered as runoff. An object of the present invention is to provide a method and system to successfully and economically reclaim the wastewater for useful purposes.

In a simple embodiment of the present invention one or more collector basins are provided to capture the material formed on the condenser as ice crystals. After a run in such a simple embodiment a basin is placed to collect material falling from the condenser, and ice may be scraped or chipped from the condenser and allowed to fall in the collector basin. The basin may then be removed, the ice crystals allowed (or forced) to melt, and the resulting effluent saved for later use as described in more detail below. In a variation of this process, one may use water to aid in the collection of the ice crystals from the condenser, and in a further variation the water used may be effluent previously collected from a similar operation, so as not to inordinately dilute the effluent being collected.

The inventors have recognized as well that contamination of the effluent in any form may be detrimental, so care has been exercised to avoid contamination. To this end collection utensils and containers may be sterilized, condensers may be cleaned on a regular basis, and sterilized as well, either with heat application, steam application, or in some cases by application of sterilization agents, such as ozone or grain alcohol.

Figure 2:
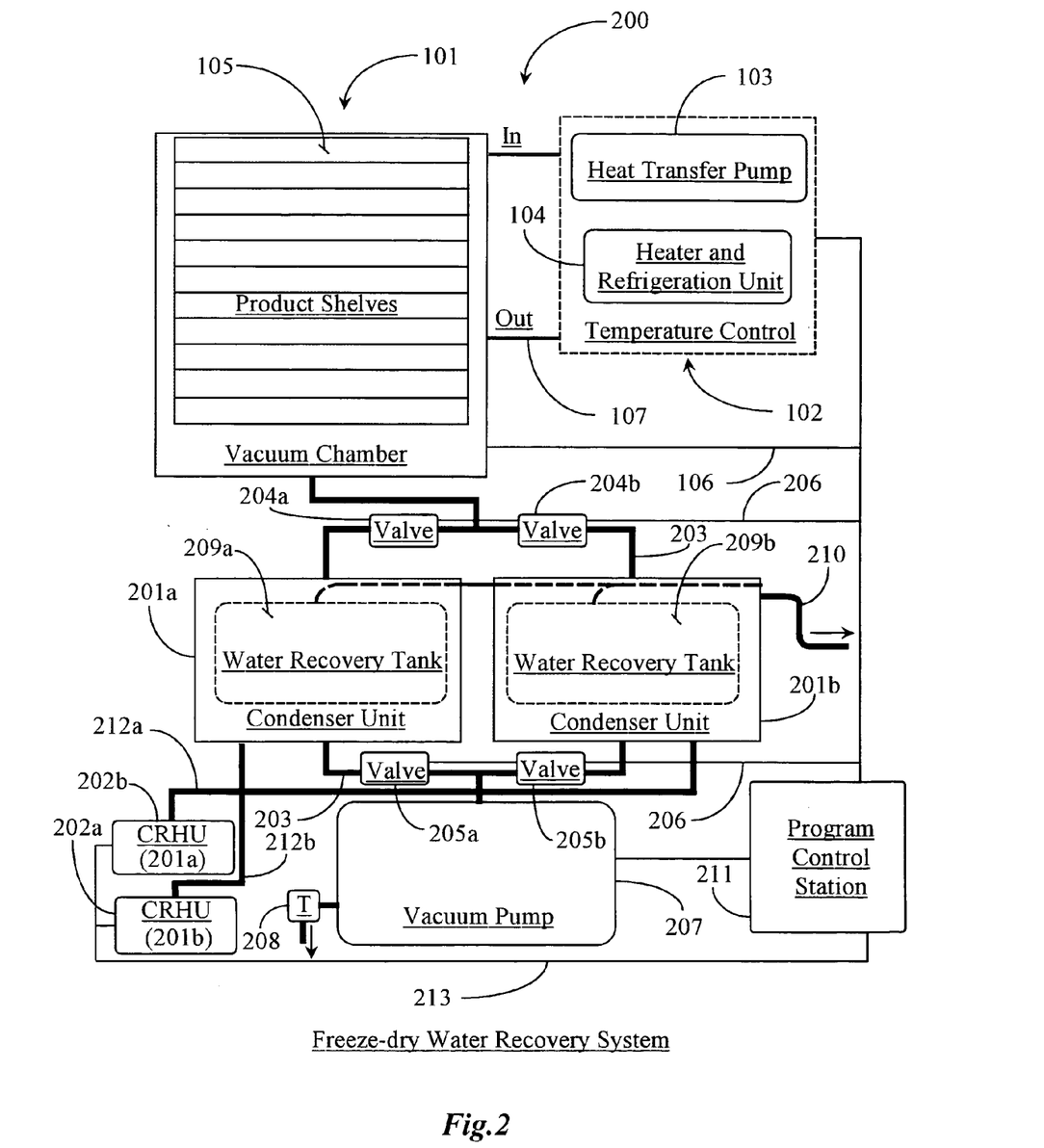
FIG. 2 is a block diagram illustrating architecture for a freeze-dry system capable of wastewater recovery according to an embodiment of the present invention.

FIG. 2 is a block diagram illustrating an architecture for a freeze-dry system 200 capable of efficient, and in some cases automated wastewater recovery according to an embodiment of the present invention. Some of the elements illustrated in this example are the same as elements of FIG. 1. Those elements retain their original element numbers and are not re-introduced.

System 200 comprises vacuum chamber 101, product shelves 105, temperature control unit 102 including pump 103 and heating/refrigeration unit 104 as described in the prior-art example of FIG. 1. System 200 in this more advanced embodiment, instead of using just one condenser, has 2 condensers, condenser 201a and condenser 201b. Condensers 201a and 201b are similar to each other and to condenser 108 described above, although this is not a limitation in the invention Condensers 201a and 201b are, in this embodiment both positioned externally to vacuum chamber 101 so that the condensers can separately be isolated from the vacuum chamber 101. A vacuum line between the chamber and each condenser has two isolation valves 204a and 204b provided for the purpose of isolating one of the condensers 201a or 201b for use during a run of product while the un-selected condenser remains idle and vented to atmospheric pressure. One may also isolate both condensers from the vacuum chamber. Each condenser is therefore accessible through a separate vacuum path and condenser chambers may be alternated during sequential product runs. An identical configuration of two isolation valves 205a and 205b and vacuum lines (203) is provided at the condenser outputs connecting to a vacuum pump 207. Although it is possible to run the system open with respect to valves 204a and 204b so as to include both condensers simultaneously in the path of vacuum, an important aspect here is to be able to isolate one condenser while another is engaged in freeze-dry operations.

Valves 204a, 204b, 205a and 205b are controlled from an enhanced program station 211 via control lines 206. Each condenser 201a and 201b has a recovery tank provided, being tanks 209a and tank 209b respectively. Recovery tanks 209a and 209b are adapted as vessels to collect recovered effluent from their respective. As such, tanks 209a and 209b are typically located directly beneath their respective condenser apparatus. Tanks 209a and 209b are at least partially open and adapted to catch ice and liquid falling from condenser apparatus located directly above. The size of openings for tanks 209a and 209b is at least great enough to enable collection of all of the ice that may collect on condensers 201a and 201b respectively. Tanks 209a and 209b may be manufactured from a durable polymer or a non-corrosive metal. Tanks 209a and 209b are also preferably connected for water transfer by a water transfer line 210. Line 210 may be a PVC piping or copper piping, or other non-corrosive metal piping.

By selective operation of valves 204a, 204b, 205a and 205b, one may operate the unit for freeze drying with one condenser being used to collect effluent, with the other condenser isolates and open to air, such that effluent condensed in a previous cycle may be removed from the condenser. The methods of removal may vary, as described above, from simply waiting for the ice to melt, to scraping ice from the condenser, or by using water or previously collected effluent to melt the ice from the condenser, or any combination of these and other techniques.

Each recovery tank 209a and 209b has, in one embodiment, a pump mechanism (not shown) provided therein and connected to line 210. In this way effluent collected in tanks 209a and 209b may be pumped out of the tanks and out of the system to such as a filtering operation through line 210. In another embodiment, line 210 is a siphon line and water collecting in tanks 209a and 209b is automatically siphoned out through line 210.

Each condenser unit 201a and 201b in an advanced embodiment may be temperature controlled by its own condenser refrigeration and heating unit (CRHU). These are CRHU 202a for condenser 201a and CRHU 202b for condenser 201b. CRHU 202a has a bi-directional transfer line 212a that connects it to condenser 201a for the purpose of enabling transfer cycling of a temperature control medium such as an Ammonia solution, Freons, or Liquid Nitrogen for cooling condenser 201a. In this embodiment, condenser 201a may also be alternately heated by CRHU 202a using some other medium such as perhaps Lexol, Propylene, Glycol, or Glycerin described with respect to the example temperature control unit 102 of FIG. 1 above. Likewise, CRHU 202b has connection to condenser 201b using a bi-directional transfer line 212b and is capable of both heating and cooling. CRHUs 202a and 202b are controlled directly from program station 211 via control lines 213.

Vacuum pump 207 is similar to vacuum pump 109 described with reference to the prior-art example of FIG. 1 except for its configuration with respect to inclusion of either condenser 201a or condenser 201b in its vacuum path. Vacuum pump 209 has a filter trap 208 connected thereto at its outgas location. Filter trap 208 may be a charcoal or other suitable type of filter adapted for filtering out volatile oil vapors before out gassing vapors into the atmosphere.

In this example, during a freeze-dry run, one condenser loaded with ice crystals from a previous run can be processed to collect effluent from the condenser while the other condenser is currently in use without interrupting the freeze-dry cycle. An alternative to an automated recovery system as described herein is to manually remove the condenser ice and let it fall into a recovery tank This can be done whether or not there are 1 or 2 active condensers, however it is time consuming and in the case of only one condenser in the system, forces unnecessary idle time for the overall system.

Using the system described in this embodiment, at the end of a freeze-dry cycle, freeze-dried product can be removed from chamber 101 and the chamber can be reloaded with new product for a next run while effluent recovery is ongoing. The condenser that was involved in the previous run can be isolated for processing while the idle condenser is switched into the system for use during the current run. In this way no time is lost in freeze-drying products. The effluent recovery method in a preferred embodiment is automatic and can be programmed from station 211 and does not require human intervention.

CRHU 202a and CHRU 202b are equipped in this advanced embodiment to alternately heat and cool by cycling an appropriate medium through channels in each condenser adapted for the purpose. When super cooling, Liquid Nitrogen may be used and when heating Propylene may be used, for example. It will be apparent to one with skill in the art that other solutions and gasses can be used as well. The effluent reclaimed from the condensers in system 200 comprises approximately 95% of the moisture extracted from product. Recovery line 210 leads out of system 200 and into a filtering process that is described more fully below.

Figure 3:
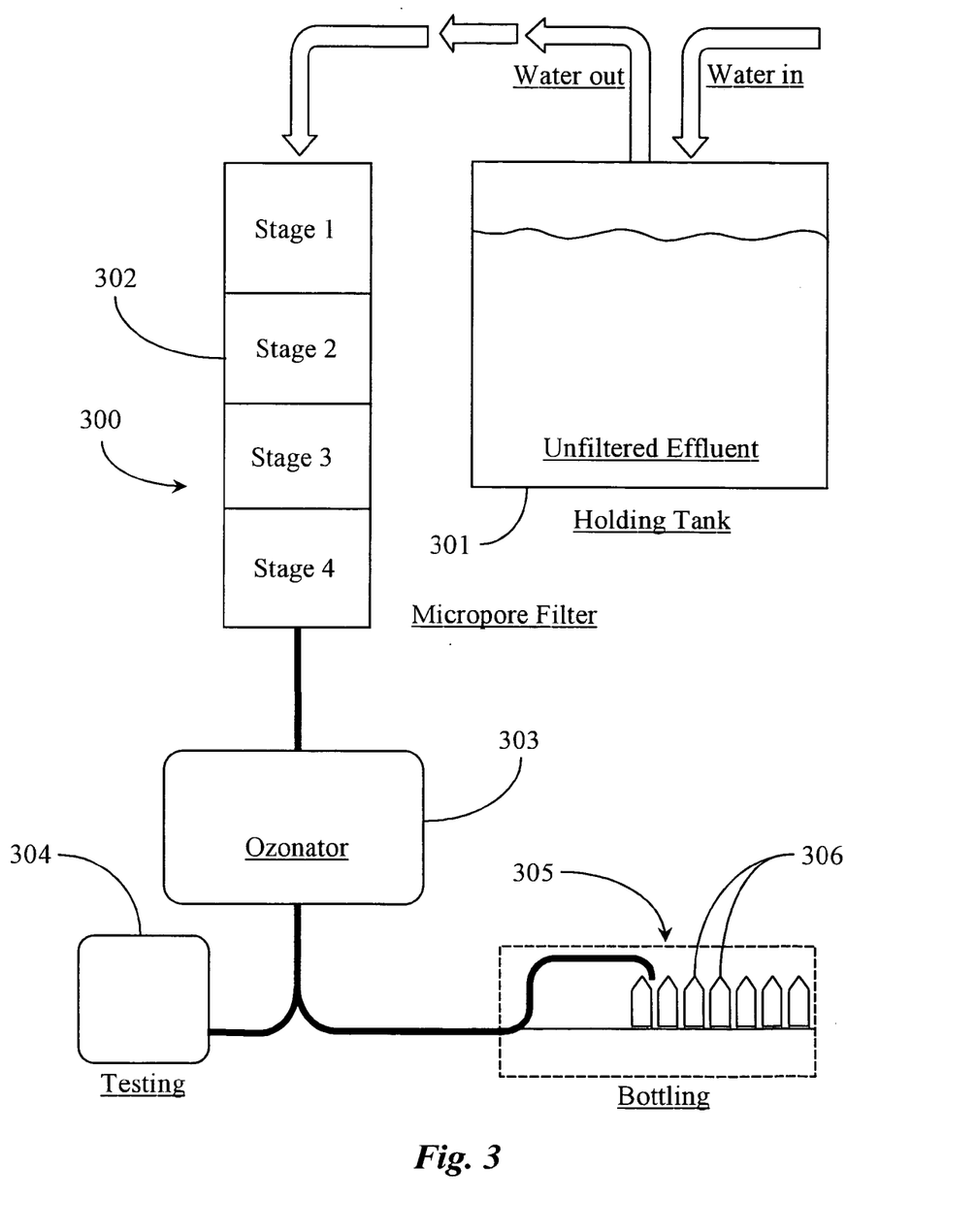
FIG. 3 is a block diagram illustrating a filtering process performed on wastewater reclaimed from a freeze-dry operation.

FIG. 3 is a block diagram illustrating a filtering process 300 performed on effluent reclaimed from the freeze-dry operation of system 200 according to one embodiment of the present invention. Process 300 begins with effluent that is collected from the freeze-dry operation and siphoned or pumped into a large holding tank 301. A directional arrow leading into tank 301 represents effluent siphoned or pumped in from the freeze-dry system through line 210 described with reference to FIG. 2 above. Effluent in tank 301 is then pumped into a 4 stage micropore filter 302. Filter 302 is adapted to remove any solids and any microorganisms from the effluent using four graduated stages. The last stages remove most of any microorganisms that may be present. Filter 302 removes particulate matter, any parasitic organisms, rust, and any unwanted chemical agents. Micropore filter 302 acts as a sieve and does not become clogged. The sizes of the filtering pores are very small down to 2 microns in diameter or width if slots are provided. The material for the filtering media can be a rigid ceramic and various stages may also include other media like charcoal, etc. In place of filter 302, other types of filtering apparatus may be used such as micro membrane filters or ultra pore filtering techniques. Various filter types and materials are readily available to and known to the inventor.

After filtering, the effluent optionally passes through an ozonator, which effectively kills any remaining microorganisms. For the purpose of general use and reconstitution of dried products, the filtering techniques are adequate for certification of the effluent as a human consumable product. The type of filtering used preserves the essence or "message" of the effluent from the dried product and does not introduce any chemicals or other foreign entities into the effluent. The resulting effluent is clear and consumable.

A testing facility 304 is provided in line after filtration to ensure the proper performance of filtering equipment and timely maintenance of filter components. Testing facility 304 may be a small lab container into which filtered effluent is diverted in a periodic sampling mode. Tests performed include tests that detect the presence of any particulate matter, microorganisms, certain chemicals, and so on.

After the effluent is completely filtered, it is pumped into a bottling facility 305 where individual bottles or "packs" of product effluent are filled and sealed as is the process for normal packaging of water and other liquid products. The filtering apparatus described herein can be considered part of the overall effluent-recovery system 200 in that the reclaimed effluent is processed in full automation until it is packaged and sealed.

The benefits of recovering effluent from the freeze-drying process are numerous. One primary benefit is that costs associated with freeze-drying can be reduced by also marketing the reclaimed effluent for such as, for example, general consumption or for product reconstitution. For example, a system that is dedicated to processing strawberries will produce "berry water" that contains the natural component signature of the product from which it was extracted. A further advantage is that the consumer now may understand that the package he or she receives includes all of the product that went into the freeze drying process.

Empirical testing has shown that effluent taken from different products will crystallize according to differing patterns. These patterns are largely the same for effluent taken from a same type product. Some implied benefits, although not proven scientifically, can be at least reasonably and logically applied in creation of a new market of consumers for the reclaimed effluent. For example, it is more probable that a freeze-dried rose will reconstitute better and faster if the water used to reconstitute it was originally reclaimed from the batch of roses that was dried. Likewise, freeze-dried mother's milk will logically reconstitute better using the original effluent than it will using tap water, which may introduce a host of chemicals and other substances that were not part of the original formula.

For human consumption on a general basis, effluent can be made available from a variety of fruits, herbs, and medicinal plants. Such effluent, void of foreign chemicals or particulate, can be marketed as certified "organic water", for example, that can be provided in as many varieties as there are consumable products for freeze-drying.

Still another benefit of recovering effluent from a freeze-drying operation is that mathematically speaking, the source of the effluent is an untapped natural resource rather than being taken from existing "out-of-body" water supplies like reservoirs, streams, and the like, or from water processing plants that supply tap water in urban systems.

Figure 4:
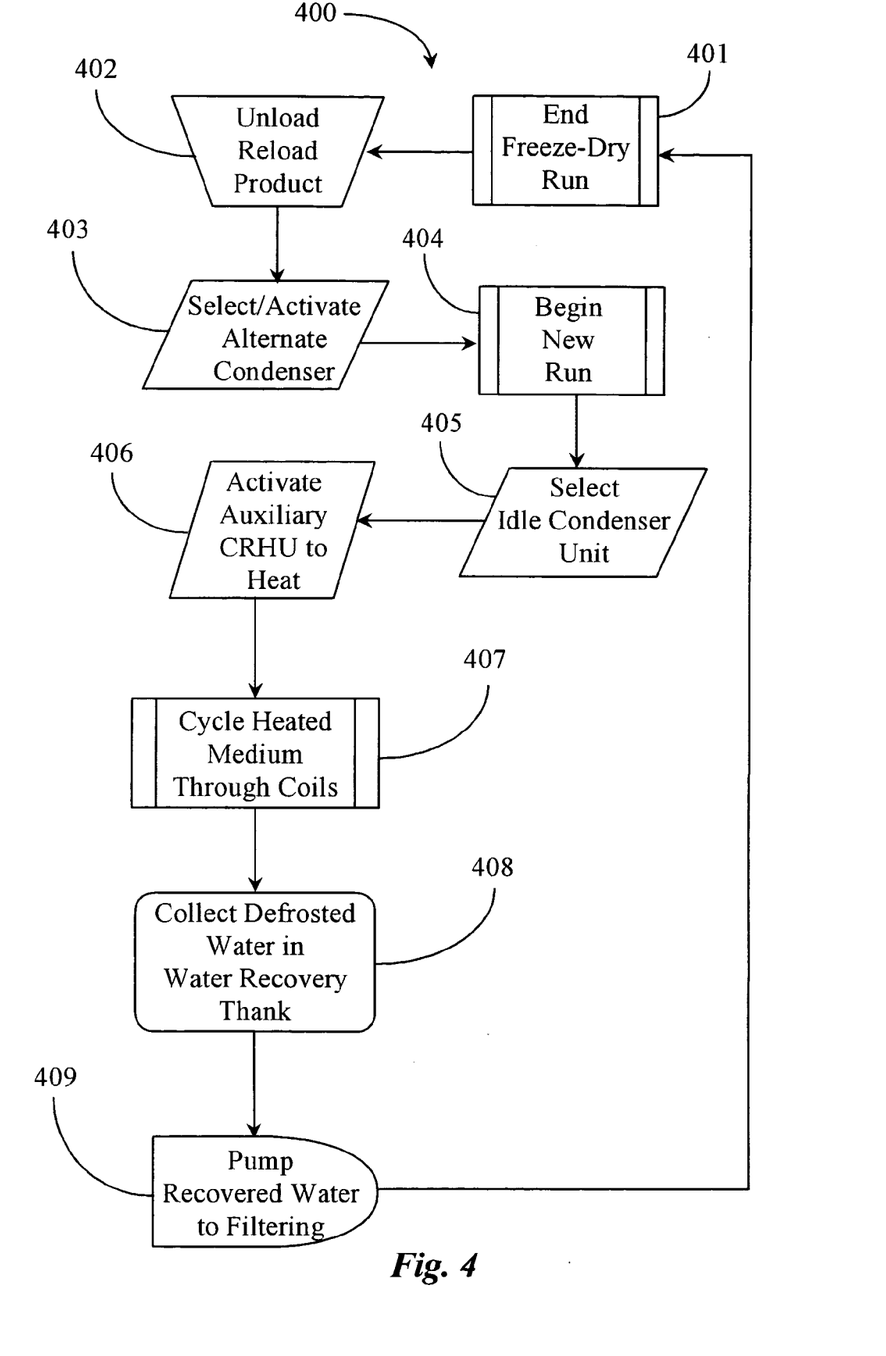
FIG. 4 is a process flow diagram illustrating steps for recovering wastewater from a freeze-dry operation according to an embodiment of the present invention.

FIG. 4 is a process flow diagram 400 illustrating steps for recovering effluent using freeze-dry system 200 according to an embodiment of the present invention. At step 401, the end of a current freeze-dry cycle has occurred. This means that the product inside the vacuum chamber is ready to be unloaded and new product can be loaded at step 402.

At step 403, the condenser which was not involved in the just-ended run is selected and activated to begin a new freeze-dry cycle by manipulating the vacuum valves from a program station analogous to the process described with respect to FIG. 2 above. This may be done automatically in some cases and manually in others. At step 404 a new product run is started.

At step 405, the now idle condenser unit is selected for the purpose of collecting effluent from the previous run. The idle condenser is of course isolated from the vacuum path of the system. It is assumed that vacuum pressure is brought up to atmosphere before opening the condenser chamber.

At step 406 the auxiliary condenser refrigeration and heating unit (CRHU), if there is one, connected to the condenser selected at step 405 is activated for a quick defrost operation. At step 407, a heated transfer medium is cycled through the condenser to be defrosted. This step may be part of an automated timed sequence, or may be manually initiated by a person operating from a control station analogous to station 211 described with reference to FIG. 2. Moreover, all of the steps of this process can be programmed for timed automatic sequencing. If there is no heating unit ice may be scraped or otherwise manually removed from the idle condenser.

At step 408, the ice crystals formed on the condenser in the previous run fall into a recovery tank analogous to tanks 209a and 209b described with reference to FIG. 2. As the effluent fills the recovery tank, in systems equipped to do so it is pumped or siphoned out of the tank before the next product run at step 409. This is because any effluent left in the recovery tank after a run will refreeze once the condenser is again utilized for super cooling in the following run. At step 409 the reclaimed effluent may be pumped to a filtering process identical or similar to the process described with reference to FIG. 3 above. Step 409 resolves back to step 401, the end of a current run. The process may loop repeatedly as long as the system is in use.

It will be apparent to one with skill in the art that the steps of process 400 can be initiated on demand from a control station, or programmed to execute automatically as a looping sequence according to time parameters. In one embodiment water recovery tanks may be fitted with a second insulated vessel held below the open portion of the tank so that effluent need not be pumped out after every run. In this embodiment effluent falling into the tank is drained into a lower insulated vessel and the effluent therein remains in a liquid state even during a super-cooling phase of the condenser. In this embodiment effluent need only be pumped out to filtering when the lower vessels are full. If lower vessels are used they can be insulated so as not to transform heat to the condenser or chamber area and can be maintained at a temperature of just above freezing by a heating system similar to temperature control unit 102 described with reference to FIG. 2.

Figure 5:
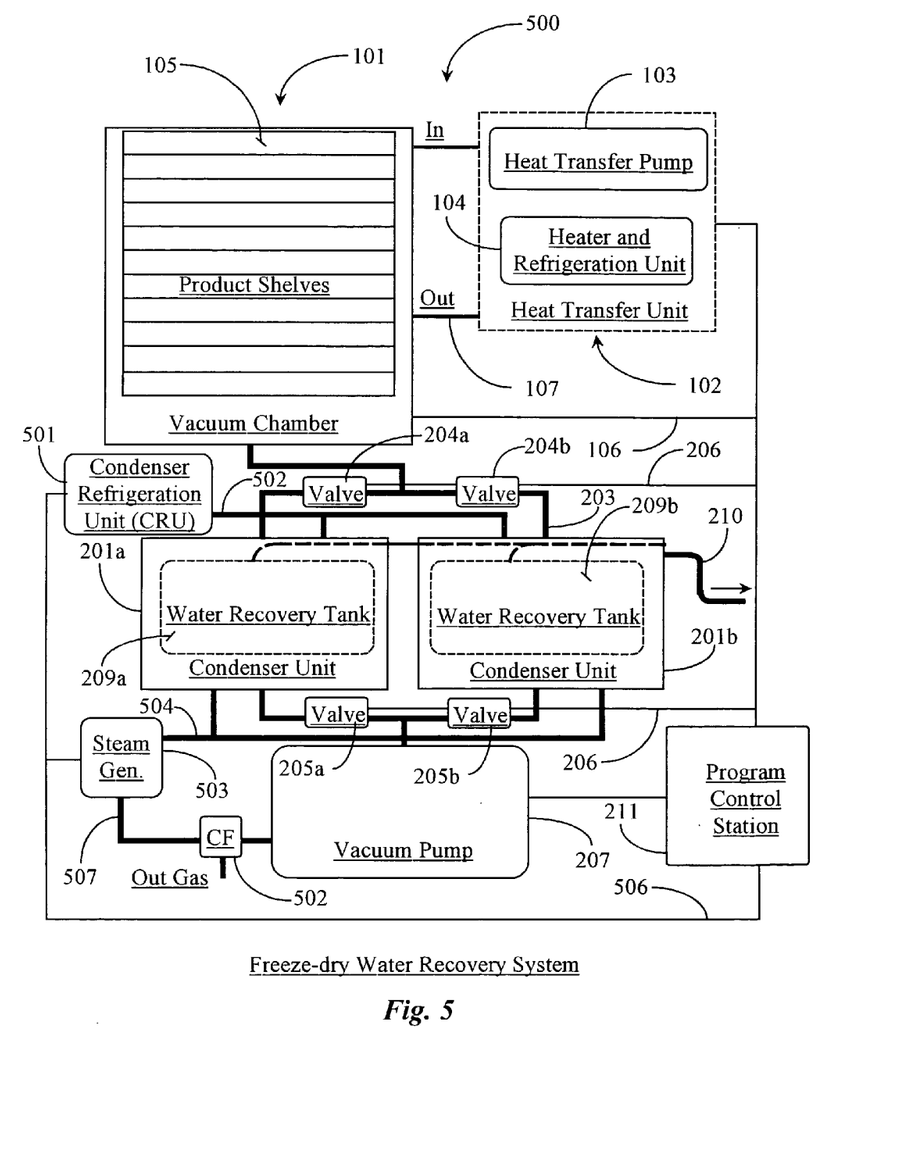
FIG. 5 is a block diagram illustrating architecture for a freeze-dry system capable of wastewater recovery according to an alternate embodiment of the present invention.

FIG. 5 is a block diagram illustrating architecture for a freeze-dry system 500 capable of effluent reclamation according to yet another embodiment of the present invention. System 500 is identical to system 200 except for components used to defrost the condensers. Components illustrated herein that were formerly introduced with respect to description of the example of FIG. 2 above shall not be re-introduced and shall retain their original element numbers.

Instead of having a separate condenser refrigeration and heating unit (CRHU) as described further above with regard to system 200, system 500 has just one condenser refrigeration unit (CRU) that does not require heating capability. CRU 501 is largely analogous in design and function to unit 111 described with reference to system 100 of FIG. 1. The only differing aspect is that unit 501 is responsible for cooling both condenser 201a and condenser 201b. CRU 501 is connected to condensers 201a and 201b by a pressurized transfer line 502. It may be assumed that line 502 has a valve (not shown) for path diversion so that CRU 501 may be selectively employed to cool one or the other condenser at a time.

Vacuum pump 207 has a compression filter (CF) 502 connected thereto at an outgas location. CF 502 is capable of separating volatile oil vapors from water vapors by compressing them into liquids and using a filter separation technique to separate the water from undesirable vapors like vacuum oil vapors. In this alternate embodiment, filtered effluent taken from vapor output of vacuum pump 207 is pumped into a steam generator 503 via a pressurized transfer line 507. Steam generator 503 heats the water to steam under pressure.

Generator 503 is connected to condenser units 201a and 201b by way of a pressurized transfer line 504. Transfer line 505 has a valve, not shown, for path divergence so that steam may be selectively injected into condenser 201a or into condenser 201b. Generator 503 collects enough water during a freeze-dry run to provide sufficient steam for quick de-icing of an idle condenser loaded with ice crystals. The melted ice crystals fall into the associated recovery tank as previously described above with respect to the description of the system of FIG. 2 and are pumped out to filtering. Small amounts of contaminant that may be borne in the steam used to defrost a condenser are filtered out using a system similar or identical to that described with reference to FIG. 3 above.

The system and process described herein though an alternate embodiment nonetheless achieves the goal of quick defrost of an idle condenser while the other condenser is super cooled during a current product run. The only reason that system architecture 200 may be preferred over system architecture 500 is that there is no exposure of reclaimed effluent to any elements out gassed during vacuum that may be introduced in the steam of system 500. However, with state-of-art element filtration virtually all of the out-gassed elements that are undesired can be trapped before steam generation occurs. Compression filter 502, generator 503, and CRU 501 are controlled from station 211 by control lines 506.

Figure 6:
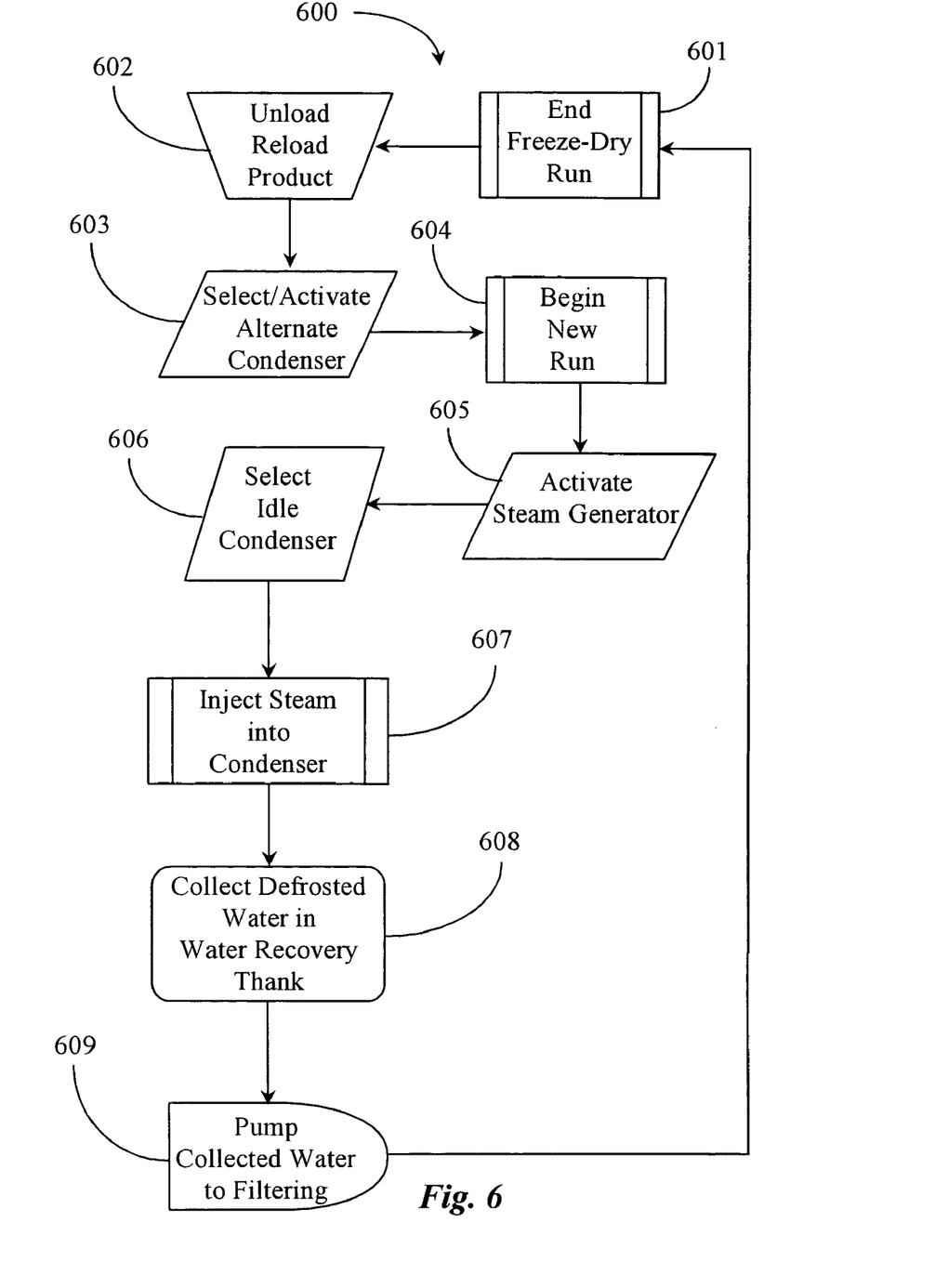
FIG. 6 is a process flow diagram illustrating steps for reclaiming wastewater from a freeze-dry operation according to an alternate embodiment of the present invention.

FIG. 6 is a process flow diagram 600 illustrating steps for recovering wastewater from freeze-drying system 500. The first 4 steps of this process are identical to the first 4 steps described with reference to process 400 of FIG. 4 above. At step 601 the end of a current product run occurs. At step 602 the dried product is removed and a fresh batch of product is placed in the vacuum chamber for a next run. At step 603 the condenser not used in the previous run is selected and activated for the next run. At step 604 the new run is initiated.

At step 605 a steam generator analogous to steam generator 503 described with reference to FIG. 5 is activated. As previously described, steam generator 503 has collected water from the outgas compression filter 502 during the previous run and has the water stored and ready for steam generation. At step 605, steam is generated under pressure.

At step 606 the condenser involved in the last product run (currently idle) is selected for defrost. At step 607, the generated steam is injected into the condenser unit to quickly defrost the ice crystals from the last run while the current run is proceeding using the other condenser. At step 608, the ice melts and falls into a recovery tank as previously described with reference to process 400 step 408. At step 609 the collected effluent is pumped to filtering as previously described with reference to process 400 step 409.

It is noted herein that the steam generation process does not use foreign water, but rather the effluent that escapes into the vacuum pump past the condenser. Any undesirable vapors have been trapped in the compression filter. Any remaining foreign elements are filtered out during the filtering process described with reference to FIG. 3 above.

It will be apparent to one with skill in the art that reclaiming the effluent from freeze drying creates new markets for general use and for later product reconstitution. It will also be apparent that the process of effluent reclamation can be accomplished efficiently without causing any time delays in commercial or private freeze-drying operations. Large commercial systems that continually cycle batches of a same product can recover a percentage of their operating costs by reclaiming and marketing the effluent instead of letting it go to waste. When a system switches to another product for freeze drying that is different from the last product in the system, a system cleaning operation can be performed to remove traces of the last product if the bio constituents between the products do not agree in terms of the effluent reclaimed from the process. For example, if a system is freeze-drying mother's milk over several runs and the system is scheduled for freeze-drying strawberries next, the system would be cleaned before starting the first run of the berries. The system of the invention creates new products and consumers not before existing in the market.

It will be apparent to the skilled artisan that there are many alterations that might be made to embodiments of the invention described above without departing from the spirit and scope of the invention. For example, there are many ways that reclaimed effluent may be packages with freeze dried product for sale to consumers, and only a few have been described. The present invention should be afforded the broadest possible consideration in light of the varied embodiments and product possibilities, some of which have already been described. The spirit and scope of the present invention should be limited only by the claims that follow.

What is claimed is:

1. A system for reclaiming and reusing effluent from a freeze drying process, comprising:
   at least one condenser apparatus used during a freeze-drying cycle to collect effluent from material being freeze-died; and
   a recovery reservoir positioned for collecting material from the condenser apparatus;
   characterized in that ice crystals formed from the effluent are removed from the condenser after the freeze drying cycle into the recovery reservoir and the resulting effluent from the ice crystals is filtered and re-used.

2. The system of claim 1 wherein there are two recovery tanks and two condensers arrayed as selectable pairs, the pairs alternately selectable for effluent reclamation.

3. The system of claim 1 further comprising a heating mechanism for heating the condenser to facilitate collection of the effluent from the condenser.

4. The system of claim 2 wherein each condenser comprises a heating mechanism to facilitate collection of the effluent from the condenser.

5. The system of claim 3 wherein the at least one condenser refrigeration and heating unit has access to two transfer mediums, one for super cooling the condenser, and another for supplying heat to the condenser.

6. The system of claim 5 wherein the transfer mediums include Liquid Nitrogen, an Ammonia solution, or Freons for cooling and Propylene, Lexol, Glycol, or Glycerin for heating.

7. The system of claim 4 wherein the condenser refrigeration and heating units have access to two transfer mediums, one for cooling and one for heating, the mediums including Liquid Nitrogen, an Ammonia solution for cooling and Propylene, Lexol, Glycol, or Glycerin for heating.

8. The system of claim 1 wherein the at least one recovery tank has a secondary vessel connected thereto for storing effluent, the vessel insulated against freezing during the freeze drying process.

9. The system of claim 3 wherein the heating mechanism is a steam generator plumbed to the condenser.

10. The system of claim 9 further including a compression filter for separating water from other components for steam generation.

11. The system of claim 9 characterized in that the ice crystals representing effluent drawn from a product being dried are collected on a selected condenser at the end of the freeze dry run and are heated by the steam generator via steam injection causing the ice to melt off into the associated recovery tank wherein it is pumped out of the tank.

12. A method for reclaiming effluent from a freeze-dry system and converting the effluent into a useable product comprising steps of:
   (a) providing at least one water recovery tank under at least one condenser unit of the system;
   (b) condensing vapor drawn from a product being dried in the system onto the condenser in the from of ice; and
   (c) collecting and melting the ice from the condenser after a freeze drying cycle;
   wherein the resulting effluent is filtered and re-used.

13. The method of claim 12 wherein in step (a) there are two recovery tanks and two condensers arrayed as selectable pairs, the pairs alternately selectable for water reclamation from a control station.

14. The method of claim 12 wherein in step (c) collecting is facilitated by a heating mechanism used to heat the condenser.

15. The method of claim 14 wherein there are two heating mechanisms, one unit for each condenser.

16. The method of claim 14 wherein the condenser has access to two transfer mediums, one for super cooling the condenser, and another for supplying heat to the condenser.

17. The method of claim 16 wherein the transfer mediums include Liquid Nitrogen, an Ammonia solution, or Freons for cooling and Propylene, Lexol, Glycol, or Glycerin for heating.

18. The method of claim 12 wherein in step (a) the at least one recovery tank has a secondary vessel connected thereto for storing effluent, the vessel insulated against freezing.

19. The method of claim 14 wherein in step (c) heating is performed by a heat source delivery mechanism in the form of a steam generator plumbed to the at least one condenser.

20. The method of claim 19 further including a compression filter for separating water from other components for steam generation.

21. A freeze dried product system, comprising:
   a freeze-dried material in one container, the material lacking effluent water removed in the freeze drying process; and
   the effluent in a second container, the effluent collected from the material in the first container during the freeze-drying process and filtered and reused.

* * * * *